Oct. 30, 1923.　　　　　　　1,472,205
A. H. BRUNNER
COOKING UTENSIL
Filed March 29, 1922
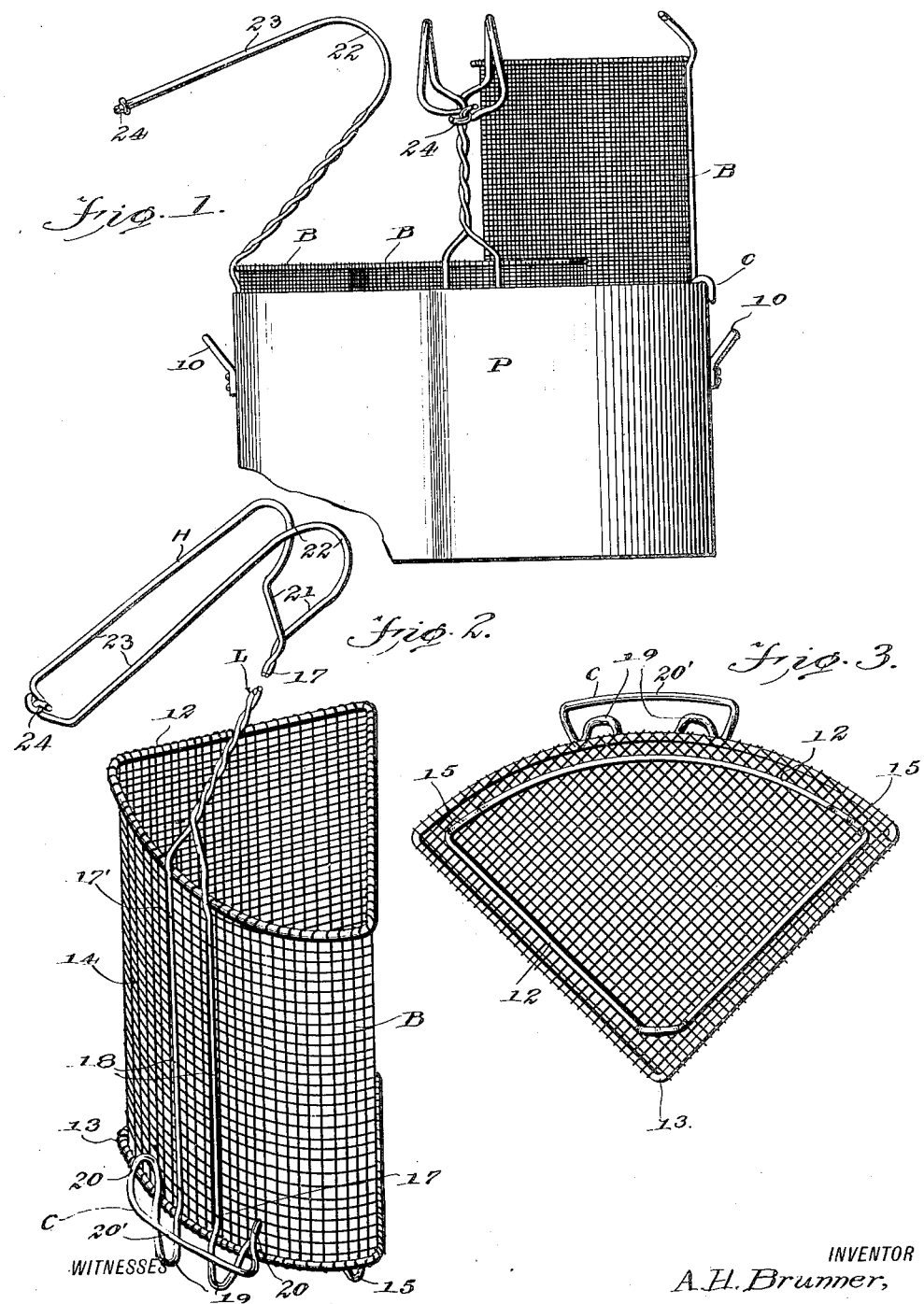
INVENTOR
A.H. Brunner,
BY
ATTORNEYS Patented Oct. 30, 1923.

1,472,205

UNITED STATES PATENT OFFICE.

ALBERT HARRY BRUNNER, OF MARION, ILLINOIS.

COOKING UTENSIL.

Application filed March 29, 1922. Serial No. 547,701.

*To all whom it may concern:*

Be it known that I, ALBERT H. BRUNNER, a citizen of the United States, and a resident of Marion, in the county of Williamson and State of Illinois, have invented certain new and useful Improvements in Cooking Utensils, of which the following is a specification.

This invention relates to improvements in cooking utensils and more particularly to a utensil adapted to be used for cooking food which requires to be fried or cooked in deep fat such as oysters, French fried potatoes, Saratoga chips of the like. This invention consists in a pot adapted to obtain fat for frying or cooking, and a plurality of reticulated baskets adapted to fit within the pot. Each basket is adapted to contain a quantity of food, and the object of this invention is to provide improved handle and supporting means for the baskets.

Other objects relating to details of construction, combination and arrangement of parts will hereinafter appear in the detailed description to follow.

The invention is illustrated by way of example in the accompanying drawings, in which:—

Figure 1 is a view in side elvation of a cooking utensil constructed in accordance with the present invention and showing one of the baskets elevated, while the remainder are lowered.

Figure 2 is a perspective view of the basket.

Figure 3 is a bottom plan view of the same.

Referring to the drawings more particularly, P indicates generally a pot which is preferably of the shape shown, that is, cylindrical and provided with a pair of handles 10.

Within the pot there may be placed a plurality of baskets B which are preferably four in number. Each basket consists in an upper and lower frame wire 12 and 13 respectively which are triangular in shape and adapted to form the end frames for the wire mesh body portion of each basket. The wires constituting the body portion 14 are of suitable gauge so that the baskets may have the proper strength, and each lower end frame member 13 is formed with a plurality of supporting members 15. For each basket B there is provided a loop of wire L which is secured to said basket and serves to form a supporting clip C and handle H in the following manner: The loop L is formed with a twisted portion 17, the lower end terminating in the two spaced wire portions 18 which are disposed longitudinally of the basket B and extended beneath several of the wires constituting the basket as at 17' in order that they may be securely held to the basket. Each portion 18 terminates at its lower end in a U-shaped portion 19, each of which are disposed in a similar plane; and said U-shaped portions each terminating in a loop 20, said loops bearing against the associated side of the basket and connected by the wire portion 20'. The connecting portion 20' and the U-shaped portion 19 are adapted to co-operate to form the clip C which may be engaged upon the rim of the pot P and to support the associated basket in an elevated position as illustrated in Figure 1 of the drawings. The basket will be supported in its proper position in the pot P but elevated from the fat which may be within the pot.

The other end of the twisted portion 17 of the loop L terminates in the divided strands 21 which are bent to form the two U-shaped portions 22, and said U-shaped portions each having its free leg extended as at 23, said extended legs being hooked together as at 24. The portions 23, 22, 21 and 17 serve to form a handle H which is V-shaped in outline.

The four baskets B are adapted to entirely secure the pot P when positioned therein. When not in use the baskets B all should be elevated with relation to the bottom of the pot. When it is desired to prepare an order of French fried potatoes, or the like, the potatoes are placed in one of the baskets B and the pot properly filled with oil. It is assumed that the pot P is placed upon a heating medium and upon lowering the basket B which contains the potatoes into fat, the potatoes will be properly cooked or fried. One basket B may be used at a time, or all may be used depending upon the wishes of the operator. The handle formed from the wire loop L forms a convenient means for lifting each of the baskets from the pot B when it is desired to empty the contents therefrom.

I claim:—

1. In combination, a container, a receptacle adapted to be positioned within the container, a plurality of wires secured to the receptacle and extending from the upper end of the receptacle and bent to form a handle, said wires being integrally connected at their lower ends and extending beneath the receptacle and bent to form combined supporting legs and a clip, said clip being adapted to be engaged upon the upper edge of the container and support the receptacle in an elevated position for the purpose described.

2. In combination, a container, a wire mesh receptacle adapted to be positioned within the container, a pair of wires extending the height of said receptacle and secured thereto, said wires being extended from the upper end of the receptacle and fashioned into a handle and also integrally connected at their lower ends and extended from the lower end of the receptacle to form supporting legs which are bent upon themselves to form a U-shaped resilient clip adapted to engage the upper edge of the container and support the receptacle in an elevated position for the purpose described.

3. In combination, a container, a receptacle adapted to fit within the container, a pair of wires secured to said receptacle and extending the entire height thereof, said wires extending from the upper end of the receptacle and having portions twisted together and the wires then separated and bent downwardly and the free ends secured together to provide a handle whereby the receptacle may be lifted from the container, and said wires being also extended below the bottom of the receptacle and integrally connected and then bent upon themselves to provide supporting legs for the receptacle and also to provide a clip adapted to be engaged upon the upper edge of the container and support the receptacle in an elevated position.

4. In combination, a container, a receptacle adapted to be positioned within the container, a pair of wires secured to said receptacle and extending below the bottom of the receptacle and turned upwardly to provide U-shaped supporting legs for said receptacle, and said wires being integrally connected at their lower ends, and the last named portions terminating in a U-shaped portion bent upon the leg portions whereby to provide a clip adapted to be engaged upon the upper edge of the container and support the receptacle in an elevated position for the purpose described.

5. In combination, a container, a receptacle adapted to be positioned within the container, a loop of wire secured to the receptacle having the lower end portions bent upon themselves to provide U-shaped supporting legs and the remaining portions of the wire forming the loop fashioned U-shaped and bent outwardly upon the supporting legs to provide a clip adapted to engage the upper edge of the container and support the receptacle in an elevated position, and the upper end portion of said loop extending above the receptacle and said portions being twisted together, and this twisted portion terminating in a downwardly and rearwardly bent portion to provide a handle whereby to lift the receptacle.

ALBERT HARRY BRUNNER.